United States Patent [19]

Li

[11] Patent Number: 5,385,612
[45] Date of Patent: Jan. 31, 1995

[54] CLEANING SYSTEM

[76] Inventor: Chou H. Li, 379 Elm Dr., Roslyn, N.Y. 11576

[21] Appl. No.: 953,749

[22] Filed: Sep. 29, 1992

[51] Int. Cl.$^6$ ............................................. B08B 3/10
[52] U.S. Cl. ...................................... 134/18; 134/34; 134/113; 134/198; 15/250.003; 239/284.1; 55/422; 55/454
[58] Field of Search .................... 134/113, 104.1, 198, 134/201, 34, 18; 15/250.003, 250.002; 239/284.1, 284.2; 359/507, 512; 55/306, 452, 451, 459.5, 422, DIG. 37, 347, 348, 349, 399, 394, 396, 395, 215, 212; 95/1, 8, 207

[56] References Cited

U.S. PATENT DOCUMENTS

| | | | |
|---|---|---|---|
| 1,448,508 | 3/1923 | Thum | 239/284.1 |
| 1,536,592 | 5/1925 | Klug | 55/422 X |
| 1,790,419 | 1/1931 | Heinemann et al. | 239/284.1 |
| 1,826,590 | 10/1931 | Adams et al. | 239/284.1 |
| 1,922,299 | 8/1933 | Juengling et al. | 55/422 X |
| 2,087,789 | 7/1937 | Allardice | 55/454 |
| 2,152,338 | 3/1939 | Will | 239/284.1 |
| 2,154,731 | 4/1939 | Crowley | 239/284.1 |
| 2,304,778 | 12/1942 | Cresswell | 55/452 X |
| 2,599,139 | 6/1952 | Stevenson | 55/422 X |
| 2,796,506 | 6/1957 | Lumbert | 359/509 |
| 3,403,859 | 10/1968 | Daansen | 239/284.1 |
| 3,772,851 | 11/1973 | Duffey | 55/212 |
| 3,993,463 | 11/1976 | Barr | 55/306 |
| 4,177,045 | 12/1979 | Orel | 55/212 |
| 4,248,497 | 2/1981 | Leighton | 15/250.003 |
| 4,538,412 | 9/1985 | Oishi et al. | 55/212 X |
| 4,718,755 | 1/1988 | Olson et al. | 359/509 |
| 4,898,458 | 2/1990 | McDonald | 359/509 |
| 4,963,011 | 10/1990 | Lu et al. | 359/509 |
| 4,971,518 | 11/1990 | Florin | 55/451 |
| 4,979,809 | 12/1990 | Peters | 359/509 |
| 5,000,333 | 3/1991 | Petrelli | 239/284.2 |
| 5,179,470 | 1/1993 | Olson | 359/509 |

FOREIGN PATENT DOCUMENTS

| | | | |
|---|---|---|---|
| 2003559 | 8/1971 | Germany | 239/284.1 |
| 2351489 | 4/1975 | Germany | 359/509 |
| 2502389 | 7/1976 | Germany | 239/284.2 |
| 2654228 | 6/1978 | Germany | 239/284.2 |
| 2943887 | 5/1981 | Germany | 239/284.1 |
| 2945860 | 5/1981 | Germany | 239/284.1 |
| 55-44054 | 3/1980 | Japan | 359/509 |

Primary Examiner—Frankie L. Stinson

[57] ABSTRACT

A cleaning system for removing undesirable material from an outer surface of a critical or sensitive element relatively moving in a fluid comprises a tubular duct for the flow of the fluid medium and having an entrance end an exit end. The entrance end is oriented generally in the opposite direction of the relatively moving fluid to receive the fluid medium. The tubular duct narrows down in cross-sectional area to define a Venturi section at the exit end thereby substantially increasing the exit fluid flow velocity. The exit end is placed adjacent to and generally directed toward the outer surface causing the high-velocity exit fluid stream to remove the undesirable materials through the momentum thereof.

23 Claims, 1 Drawing Sheet

CLEANING SYSTEM

BACKGROUND OF THE INVENTION

This invention relates in general to cleaning or protective systems for sensitive optical, mechanical, electrical, or chemical components and, more particularly, to cleaning systems for optical elements on a vehicle relatively moving rapidly in a fluid medium.

The systems of this invention have applications to minimize undesirable materials or objects that cause optical obstructions or degradations on critical optical components; wear, jamming, breakage, overloading, or other degradations in sensitive mechanical components; shorting and leakage currents in delicate electrical components; or severe corrosion, contamination, or unwanted chemical reactions in important chemical components. These degradations often make the operation of the sensitive components and elements or related equipment difficult or dangerous.

For illustration purposes, these systems are described mostly with cleaning systems that remove or prevent the accumulation of undesirable material or object such as water, rain, fog, and particles of dust, salt or frozen water (snow, ice, hail) from optical components or elements on a vehicle; or snow or ice from airplane or hydroplane wings; or pebbles, sand, leaves, twigs, or birds from jet engine air intakes. The vehicle relatively moves rapidly at a given velocity v in a fluid medium such as air;

Light-transmitting windows or light-reflecting mirrors on vehicles (such as automobiles) relatively moving in a fluid medium (air, mixed air and water, or other fluid) often degrade in their light transmitting or reflecting qualities if undesirable material or object such as those listed above strike or collect on them.

The conventional automobile, has defroster on the front and/or back windows. The defroster only slowly removes thin snow or ice, and yet consumes much power to heat the cold air and to blow out the hot air. In addition, the motor-generated air stream has relatively low velocity to efficiently remove many undesirable materials or objects. Also, they are no devices to clean the many undesirable materials and objects on the side windows or rearview mirrors.

SUMMARY OF THE INVENTION

Therefore, to overcome the foregoing and other difficulties, the general object of this invention is to provide an improved, protective or cleaning system to remove the undesirable material or object from the outer surface of an optical element on a vehicle moving in a fluid medium.

An object of the invention is to provide the vehicle with a cleaning system which consumes little or no external power;

It is another object of the invention to provide a cleaning system which is efficient in material removal, particularly when it is most needed;

Yet another object is to clean critical outer surfaces on instruments or equipment whose performance is optically, chemically (due to corrosion or etching), electrically (due to shorting, leakage current, changed resistance, capacitance, or inductance), mechanically (erosion, wear, increased mass, ...), or otherwise sensitive to specific undesirable materials and objects;

A further object is to remove snow or ice from an airplane wing or a helicopter blade;

A still further object is to remove snow, ice, sand, stones, pebbles, leaves, twigs, birds, ... from the air intake of a rapidly moving jet or similar engine.

Various other objects and advantages, and a more complete understanding of the invention, will become apparent to those skilled in the art from the following description and claims, taken in conjunction with the accompanying drawings.

This invention discloses a cleaning system for removing undesirable materials or objects from an outer surface of an optical element relatively moving in a fluid medium. The system comprises a tubular duct for the flow of the fluid medium having an entrance end and an exit end. The entrance end is oriented to receive the moving fluid medium. The fluid duct monotonically narrows down from the entrance end to define a Venturi section at the exit end. The exit fluid flow velocity is thereby significantly increased and, being properly directed at the outer surface, causes the exit fluid stream to remove from the outer surface the undesirable materials through the momentum thereof. The system is provided with a sensor, an actuator, and a microprocessor to selectively control its operation mode. The undesirable material or object may also be removed from the contaminated fluid stream when the fluid stream is spiraled along a helical path, to generate separating centrifugal forces due to the density difference between the lighter fluid medium and the heavier undesirable material or object.

DESCRIPTION OF THE DRAWING

For the purpose of illustrating the invention, there is shown in the drawing the forms which are particularly preferred. It is understood, however, that the invention is not necessarily limited to the precise arrangements and instrumentalities here shown but, instead, may combine the same described embodiments or their equivalents in various forms.

DESCRIPTION OF THE PREFERRED EMBODIMENTS

Figure 1:
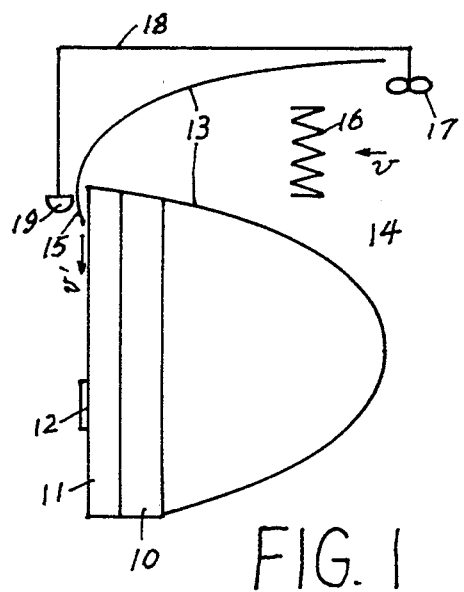
FIG. 1 is a vertical section through a rearview mirror on an automobile.

With reference to FIG. 1, there is shown a critical optical element in the form of a rearview mirror 10 on the side of a vehicle. This vehicle may be an automobile, truck, airplane, boat, ship, helicopter, train, ... Each of the land vehicles moves totally in a single fluid medium consisting essentially of air, moisturized air, or air mixed with rain, snow, or ice. Submarines or other submerged vehicles move entirely in water. But boats and ships move partly in water and partly in air. Other vehicles, including instruments, equipment, devices, ..., may be moving, partly or entirely, in oil, liquid chemicals, or other fluid media.

The rearview mirror 10 on the vehicle used for illustration of the invention is a light-reflecting optical element. A light-transmitting optical element such as a front, side, top, or rear window on the vehicle may also be the sensitive optical element that can benefit from this invention. On all these optical elements, it is highly desirable that the functioning outer surface 11 of the optical (or mechanical, electrical, chemical, . . . ) element is free of undesirable materials such as those listed above.

The cleaning system of this invention is therefore designed to remove, or to prevent the accumulation of, the undesirable materials from the exposed or outer surface 11 of the optical element (e.g., a rearview mirror 10) on the vehicle (e.g., automobile). This vehicle is either moving in the fluid medium at a given velocity, v, or is stationary but has the medium (e.g., air wind or water waves or current) moving against it at the same velocity. A tubular duct 13 for the flow of the fluid medium (air, water, . . . ) therein is selected. This duct has an entrance end 14 and an exit end 15. The entrance end 14 is oriented substantially along the direction of the relative fluid movement velocity, but in the opposite direction, to receive thereinto the moving fluid medium in the form of a fluid stream entering at substantially the given velocity, v. Preferably, the tubular duct monotonically narrows down from the entrance end 14 to define a Venturi section at the exit end 15. This narrowing down of the duct cross-section substantially increases the exit fluid flow velocity v' to significantly higher values, e.g., over 5 times higher, than the given velocity v.

The exit end 15 is mounted adjacent to and generally directed toward the outer surface 11 of the rearview mirror on the automobile. This outer surface is generally planar and often rectangular in shape. The rearview side mirror on the automobile, for example, is generally rectangular in shape with slightly less width at the bottom than at the top. The mirror and has two horizontal major edges and two vertical minor edges, but its shapes and sizes vary. A typical rearview mirror has a maximum width of 165 mm, a maximum height of 92 mm near the car, and a minimum height of 84 mm away from the car, with all the four corners rounded. The width/height ratio varies from 1.0 (circular mirror) through 1.5 to over 2. The air flow duct 13 is therefore preferably rectangular in cross-section, but may be a rounded (circular or elliptical) duct which is flattened at the exit end 15 into a narrow slit having a very large (over 5 or 10) width/thickness ratio. For maximum cleaning efficiency, the slit-shaped exit end 15 locally conforms to the outer surface 11, e.g., parallelly extends along the entire top horizontal major edge, and at no more than 6–14 millimeters (mm) apart therefrom. The exit air flow is thus flattened and covers the entire, if not at least a major portion of, the generally planar outer surface 11 of the rearview mirror 10.

The cross-sectional area ratio, R, of the entrance end 14 to the exit end 15 is in the range of 3 to 40, and preferably over 8, to achieve high exit fluid velocity v'. Neglecting air friction inside the tubular duct 13, the exit velocity v' at the Venturi section at the exit end 15 is roughly R times the entrance velocity v, namely, $v' = R \times v$ roughly. The high-velocity exit air stream, flowing adjacent (within less than 8 mm) to and directed toward the outer surface 11 at a proper angle, therefore effectively blows away the undesirable materials, or prevents these materials from collection, through momentum effects of the high-velocity exit air stream.

In FIG. 1, the exit air stream at velocity v' is tangentially oriented relative to the outer surface 11. The same air stream may be at an angle less than 30° relative to the outer surface. The same air stream may even be oriented normally of the outer surface. The best angle depends on the type, size and shape of the mirror, relative velocity of the vehicle, the undesirables materials and other factors.

The outer surface 11 of the rearview mirror 10 is generally in a vertical position. The exit air stream is therefore also oriented vertically downward, from the top major edge to the bottom major edge of the mirror. This arrangement is desirable because it allows the maximum gravitational forces on the undesirable materials to help their removal once they are loosened or detached by vibrations or the exit air stream. In other cases, however, the exit air stream may be inclined to the outer surface 11, or may even be directed normally of this outer surface. The normally applied exit stream should preferably be sudden and quick, to be periodically repeated as is needed for thinning down water droplets and to rapidly blow away collected water or ice drops 360° in all their peripheral directions.

Experiments show that under a constant exit air (water, or other fluid) stream, the drop of many yieldable undesirable materials (e.g., water in air stream, oil or other fluid in water stream, and the like) on the outer surface 11 automatically and rapidly assumes a streamlined shape. This shape is so oriented relative to the exit air stream that the drop has the minimum exposed surface to the stream. Hence, the thus shaped and oriented drop has the maximum staying power onto the outer surface 11. In other words, the drop quickly adjusts itself to become the most resistant to the removing forces of the high-velocity exit air stream.

A continuously applied, constant exit air stream, regardless of its orientation relative to the outer surface and other parameters, is therefore less effective in removing the undesirable materials than if the shape, size, orientation, and velocity of the exit stream is periodically, continuously, or suddenly modulated, perturbed, or fluctuated. Changes of other exit air stream characteristics, such as aiming point, aiming direction (i.e., orientation relative to the outer surface), shape, cross-sectional area, flow velocity, division of the exit fluid stream into multiple streamlets, and the number of these exit flow streamlets and their orientations or velocities, and the like are, therefore, highly desirable and will be exemplified below.

One way to perturb the exit air stream is to interrupt the air flow directed at a selected portion of the outer surface. The perturbation may be time-dependent, space-dependent, or both. Periodic shutting off and opening up of the exit air flow by, e.g., an air valve connected to an air turbine, directly or indirectly (e.g., through a flexible shaft). The air valve turns off the air flow at certain angular ranges and turns the flow back on at other angular ranges. For example, the air valve may be on at positions 0°–180°, but off at 181°–360°. The air turbine may be run by part of the air stream entering the entrance end 14 at velocity v. Water or other fluid turbines may be used for cases when the vehicle is relatively moving in water or the other fluid. Since the fluid turbines are powered by the incoming air or other fluid at the entrance end 14, no external power is used in these cleaning systems.

FIG. 1 shows an alternative perturbation method for the exit fluid stream. In this example, a fluid turbine 17 having a number of vanes which rotate under the influence of the incoming air stream with velocity v at the entrance end 14. This fluid turbine may be used to turn on the air valve described above. In FIG. 1, however, the rotating turbine shaft is connected to a cam 19 through, e.g., a flexible shaft 18, with or without gear trains (not shown) to change the rotational speeds. The cam periodically presses on a flexible (e.g., rubber) outside surface of the exit end 15 to shut off the exit fluid flow.

Another way to achieve the exit stream modulation is to simply select the material of the flexible exit end 15 to be of such a resiliency (e.g., rubber, plastic, or sheet metal) that it allows an initial exit fluid flow, but stops this fluid flow under reduced internal fluid pressure due to the high exit velocity v' at the Venturi section. Periodic on-off of the exit air stream thus also result.

Figure 2:
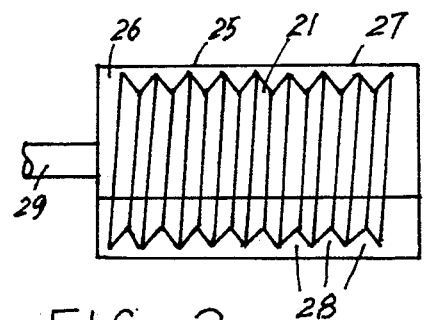
FIG. 2 shows a cross-sectional view of a threaded screw for distributing the exit air streams used on the cleaning system.

A still another way to perturb the exit air flow, shown in FIG. 2, is to provide a variable flow-distributing means mounted or attached to the exit end 25 to divide the exit fluid flow stream into a plurality of smaller, air flow streamlets for distribution onto the outer surface 11. The flow-distributing means may be simply a multiply slotted member in the form of, e.g., a horizontal threaded screw 21 in FIG. 2. The threaded screw tightly fits into the exit end 25. The top half of the exit end is covered with a fluid-impervious sheet 26 to prevent the air (or other fluid) from escaping.

The horizontal, threaded screw 21 thus divides the single exit air flow stream out of the exit end 25 into multiple air streamlets, corresponding to the number of threads on the screw 21. Two neighboring threads on the screw, combined with the fluid-impervious material 26 and the enclosure 27 surrounding the screw, provide an opening 28 for an air flow streamlet. Another flexible shaft 28 connected at one end to a fluid turbine (not shown but actuated by the entrance fluid stream) and to the threaded screw 21 on the other end will rotate the screw 21 to change the lateral positions or aiming points of the multiple exit air streamlets 28 that impact at the outer surface 11. That is, the threaded screw 21 will move the multiple streamlets 28 laterally (i.e., left or right in FIG. 2) on the outer surface 11. The same fluid turbine 17 shown in FIG. 1 may also be used both to activate the flow-interrupting cam 19 in FIG. 1 and to turn the flow-distributing threaded screw 21 in FIG. 2.

Another perturbation method is to attach each end of multiple (e.g., 12) equally spaced, narrow (12 mm) and short (25 mm), flexible ribbons to the exit end and to let the ribbons vibrate and flutter in the exit air stream. The vibrations and flutterings perturb the exit air stream. Properly designed as to ribbon materials (e.g., rubber, plastic, or sheet metal), elasticity, shapes (particularly the unattached tips), sizes, stiffness, . . . , this simple, low-cost device may be very reliable and efficient. The appropriate selection of the ribbons can readily be determined by simple tests.

In FIG. 1, the rear view mirror 11 has its outer surface 11 facing to the rear of the car. The back side of the mirror faces the front of the car. This back side is preferably streamlined in shape, as shown, to minimize air resistance during motion of the vehicle. This back side also forms the lower side 13 of the entrance end 14. The top side 13 of the entrance end 14 should also be designed to be streamlined. This design additionally simplifies the construction of the cleaning system, minimizes its initial and maintenance costs, provides high reliability, and makes the system highly efficient as to cleaning efficiency and fuel economy of the vehicle.

To reduce the viscosity and to increase the flow velocity of the air or other fluid stream inside the duct 13, however, an electrical heater 16 may be mounted inside the flow duct 13 to increase the temperature of the exit air (or other fluid) flow. The heater heats up the air, lowers air viscosity and increases hot air volume, enhances the exit air flow velocity v', and improves the material removal efficiency. High exit air temperature also help loosen or melt frozen or partly frozen water (or oil) particles for their removal.

The higher the velocity of relatively movement v of the vehicle relative to the fluid, the higher the speeded exit air flow velocity v' and the better the efficiency of material removal. Hence, the cleaning system becomes more efficient with increasing need of material removal, such as when the vehicle is moving at high velocities v.

The cleaning system of FIG. 1 may be microprocessor controlled. For example, signals from an electronic sensor 12 which senses the amount (e.g., weight or thickness) of the undesirable material, directly on the sensitive element (e.g., outer surface 11) or indirectly by extrapolation from a location near the sensitive element, may be used for the control. The sensor, preferably located on the outer surface 11, may also control the operation of a defrosting heater 16. Specifically, when the amount e.g., (weight or thickness) of accumulated ice or snow is below a first limit, the cleaning system needs not be in operation. In this case, the top air duct surface 13 may be folded over by, e.g., a step motor (not shown) to come down onto the streamlined lower duct surface 13, which is also the top back surface of the rearview mirror 10. The air duct 13 then practically disappears. As shown in FIG. 1, the top surface of the rear-view mirror structure 10 (first surface) and the bottom surface of the fluid flow duct (second surface) 13 are, respectively, the two major surfaces of a single sheet material. Also, the bottom surface of the fluid flow duct 13 and the top surface of the fluid flow duct (third surface) 13 are similarly curved with a curvature which generally matches that of the streamlined first surface so that the closed front portion on a non-operative cleaning system is also at least nearly streamlined relative to the moving fluid stream. When the amount of snow or ice sensed exceeds the first limit, the top duct surface 13 will be automatically raised up (by the same step motor) to provide a fully open air duct 13 and its entrance end 14. Incoming air at velocity v can then enter the entrance end 14, to exit at a greater velocity v' at the exit end 15. When the sensed snow or ice exceeds a second, higher limit, the defrosting heater 16 is turned on to help remove fog and loosen or melt ice or snow.

Figure 3:
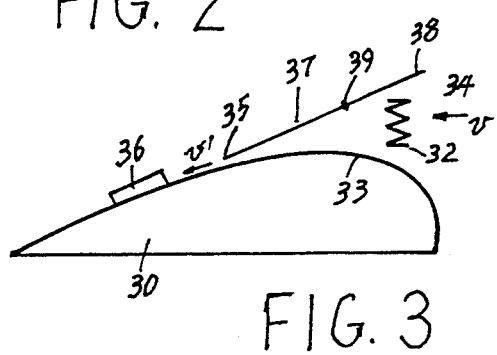
FIG. 3 illustrates a section through a cleaning system to remove ice or snow on an airplane wing.

FIG. 3 shows a vertical section of an airplane wing 30. The front end of the wing, pointing to the right side of FIG. 3, is normally streamlined to minimize air resistance during the airplane flight. Preferably, the top surface of a new or modified airplane wing 30 forms the lower surface of the air duct 33 extending from the entrance end 34 to the exit end 35. The top side of the entrance end 34 is made of two portions 37 and 38, which are joined by a hinge 39. The rear portion 37 is fixed in position and forms the stationary exit end 35 and part of the fluid flow duct 33. The movable front portion 38 is hinged at the hinge 39 so that it can be moved up into the operation mode or be moved down into the non-operation mode, preferably with automatic control, with a microprocessor, a sensor, and an actuator.

The control of the hinge movement is by air jacks (an actuator which is not shown), according to signals from an electronic sensor 36 to measure the amount (weightor thickness) of snow or ice on the wing. The sensor is suitably positioned on the wing 30. The sensor also controls the operation of a defrosting heater 32, which is similar in operation to the defrosting heater 16 in FIG. 1. When the amount ice or snow is below a first limit, the front portion 38 is moved down to lie on top of the wing's top front surface. The cleaning system is then in the non-operation mode. The air duct 33 now practically disappears. When the sensed snow or ice exceeds the first limit, the front portion 38 is moved up into the operation mode to provide a fully open entrance end 34. Incoming air at velocity v then rushes into the entrance end 34, to exit at a still greater velocity v' at the exit end 35. When the sensed snow or ice exceeds a second, higher limit, the defrosting heater 32 is turned on.

Figure 4:
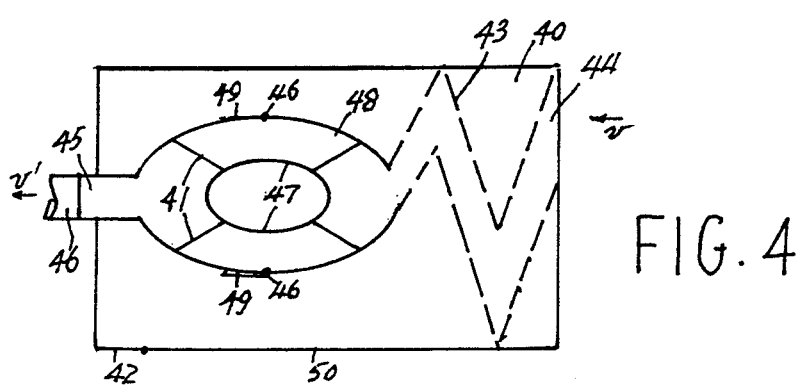
FIG. 4 is a vertical cross-section of the invention used to remove sand, pebble, leaves, twigs, birds, ... from the air intake for a jet engine.

FIGS. 4 is a side view of a cleaning system 40 designed to remove sand, dust, pebble, leaves, twigs, birds, and other undesirable foreign objects or materials from the air intake of a jet engine on, e.g., a jet plane. The side view shows only an air entrance hole for the entrance end 44. In this system, the air duct 43 is in the form of a spiral or helix tube. The high-velocity incoming air stream, which contains the undesirable materials or objects, is forced to move along the same spiral or helix path of the air duct 43. During the spiral movement, the air stream and the foreign materials and objects acquire still higher velocities v' because of the reducing cross-sectional area of the air duct from the entrance end 44 toward the exit end 45.

The air duct 43 near the exit end 45 comprises two concentric tubes 47 and 48, with their both ends rounded into streamlined shapes, as shown. The outside tube 48 connects to the air duct 43 on the right and to the air intake tube 46 of the jet plane on the left. The air duct 43 thus is a spiral tube near the entrance end 44, but changes in shape first into a tube with a donut-shaped cross-section, and then back into a cylindrical tube at the exit end 45, for connection with the air intake tube 46 of the jet engine.

In the middle, donut-shaped region, the high-velocity air stream flows between the walls of the two concentric tubes 47 and 48, joined together by steel rods 41. The outside tube 48 is provided, around its periphery, with a number (e.g., six or eight) of symmetrically located, spring-loaded (not shown) doors 49 which are hinged at hinges 46. The spring forces keep the doors normally shut, even with the high-velocity air streams rapidly flowing inside. When the incoming air is laden with the undesirable materials and objects listed above, and having significantly higher densities than that of the fluid medium such as air or water, these rapidly spiraling materials and objects inside the concentric tubes will push open the doors 49, because their centrifugal forces are designed to be greater than the spring forces. Even spiraling at about the same velocities as the undesirable materials or objects, the lower-density fluid medium has a less centrifugal force (being proportional to the mass), cannot exit through the same resilient or springy doors 49, and is thus kept inside the air flow duct 43, as it should be. These materials and objects will then be removed from the intake air and fly out of these doors, to be deposited into the storage space between the outside tube 48 and the enclosure 50 of the cleaning system 40. Accumulated undesirable materials and objects are periodically discharged through the door 42 at the bottom of the system. Except for the airflow path from the entrance end 44 to the exit end 45 and at the spring-loaded hinged doors 49, the air duct 43 is airtight to prevent loss of air and air pressure in the cleaning system.

In the cleaning system 40, the air flow duct 43 is preferably monotonically decreasing in cross-sectional area from the entrance end 44 toward the middle, donut-shaped region (with a complex, donut-shaped Venturi section) where the spring-loaded doors 49 are located. This design achieves the maximum centrifugal forces to achieve maximum removal of the undesirable materials and objects. After the donut-shaped region, a real reduction of the air duct 43 is no longer critical or even needed.

The invention, as described above, is not to be construed as limited to the particular forms disclosed herein, since these are to be regarded as illustrative rather than restrictive. For example, specially slotted metal or plastic members may be used instead of the threaded screw 21 to distribute the exit air flow uniformly or nonuniformly along the length of the member. In nonuniform exit air distribution, the central or peripheral portion of the outer surface 11 may be emphasized, respectively for better visibility or because of the generally lower temperatures at the peripheries thereby requiring more air, especially hot air. Many other ways to perturb the exit air flow are also possible. Further, various combinations, equivalent substitutions, or other modifications of the preferred embodiments described herein are obviously possible in light of the description, without departing from the spirit of the invention. Accordingly, the invention is to be limited only as indicated by the scope of the appended claims.

I claim:

1. A cleaning system for removing undesirable material or object from a sensitive component or element on a vehicle which is relatively moving in a fluid medium at a given velocity, said vehicle having a front end which faces the incoming fluid medium and a rear end which does not face the incoming fluid medium, the density of said undesirable material or object being significantly greater than that of said fluid medium, comprising:

wall means defining a fluid flow duct having an entrance end and a smaller-sized exit end, said entrance end generally facing said incoming fluid medium to cause the fluid medium to enter said fluid flow duct at substantially the given velocity, said wall means narrowing down in cross-sectional area from the entrance end toward the exit end to increase the velocity of the exit fluid stream to a value significantly higher than the given velocity thereby removing, through momentum of the higher-velocity exit fluid stream, said undesirable material or object from said sensitive component or element;

actuating means for opening or closing said fluid flow duct to make the cleaning system operative or non-operative, respectively;

means for sensing the amount of said undesirable material or object already present on said sensitive component or element to determine if the cleaning system should be in the operative or non-operative mode; and computer means coupling said sensing means and said actuating means to automatically and selectively put the cleaning system into the desired, operative or non-operative mode.

2. A cleaning system as in claim 1 wherein one side of said sensitive component or element also faces the incoming fluid stream and has a first surface which is streamlined to minimize fluid resistance during the relative motion of the vehicle in said fluid medium;

said wall means comprising a second surface extending from the entrance end to the exit end and a covering member having a third surface which, together with said second surface, completely encloses said fluid flow duct; and said second surface generally conforming in shape to said first surface at at least said entrance end thereof so as to be also streamlined relative to said moving fluid medium.

3. A cleaning system as in claim 2 wherein said first surface and said second surface are, respectively, the two major surfaces of a single sheet material.

4. A cleaning system as in claim 2 wherein said covering member comprises a movable portion near said entrance end, a stationary portion spaced at a distance away from the movable portion, and means for flexibly joining these two portions together at a flexible joint therebetween to provide said third surface in a flexible form, the movable portion being movable at the flexible joint to open UP or close down thereby putting said cleaning system respectively into the operative or non-operative mode, in the non-operative mode, the movable portion coming down on top of the second surface whereby the entrance end of the fluid flow duct practically disappears, in the operative mode, the movable portion moving up to keep said entrance end open for the incoming fluid to enter thereinto.

5. A cleaning system as in claim 4 wherein said second surface and said third surface are similarly curved with a curvature which generally matches that of the streamlined first surface so that a closed entrance end on the non-operative cleaning system is also at least nearly streamlined relative to the moving fluid stream.

6. A cleaning system as in claim 5 wherein said sensing means comprises means for sensing the amount of said undesirable material or object present in the fluid medium to adversely effect the performance of said sensitive component or element, and wherein said computer coupling means comprises a microprocessor coupling said sensing means and said actuating means to control the flexible joint movement for raising or lowering the movable portion to put the cleaning system into the operative or inoperative mode, respectively.

7. A cleaning system as in claim 1 wherein said vehicle comprises a vehicle-powering engine which intakes said moving fluid medium and a device for intaking and supplying said fluid medium to the vehicle-powering engine; and wherein said fluid flow duct comprises:

a spiral or helix tube to force the incoming fluid stream containing said undesirable material or object to enter at a fluid entrance end thereof and to move along a spiral or helix path therein for exiting at a fluid exit end thereof, during the spiral or helix movement, the flowing fluid stream containing the undesirable material or object acquiring centrifugal forces which are greater on the denser undesirable material or object than on the less dense fluid medium; and means for separating the undesirable material or object from the intake fluid medium according to the centrifugal force thereon relative to that on the intake fluid medium.

8. A cleaning system as in claim 7 wherein said separating means comprises:

a centrifuging tube having an outside tube and an inside tube connected to and concentric relative to the outside tube, said two concentric tubes forming a middle, donut-shaped section in which said centrifugal separation takes place, the outside tube connecting at an entrance end thereof to a fluid exit end of said spiral or helix tube and at an exit end thereof to said intaking and supplying device to supply said fluid medium to the vehicle-powering engine, thereby changing the cross-sectional shape of the fluid flow duct from that of the spiral or helix tube near the entrance end of the outside tube first into that of said centrifuging tube with the donut-shaped section, and then to that of said exit end thereof for connection thereat to said intaking and supplying device; and causing the fluid stream to flow between the walls of the two concentric tubes in the middle, donut-shaped section of said centrifuging tube; and at least one resilient door provided at the periphery of said outside tube, the resilient force on the door keeping the door normally shut even with the fluid stream flowing between the two concentric tubes; but allowing said undesirable material or object to acquire a sufficient centrifugal force for pushing open the resilient door, and to escape out of said door for its removal from the intake fluid medium for the vehicle-powering engine.

9. A cleaning system as in claim 1 wherein said undesirable material or object is selected from a group consisting of ice, hail, snow, water, rain, fog, dirt, dust, and, stone, pebble, leave, twig, bird, and a mixture thereof;

wherein said fluid medium is selected from a group consisting of air, water, and liquid chemical;

wherein said vehicle is selected from a group consisting of automobile, truck, airplane, hydroplane, submarine, boat, ship, helicopter, train, jet-powered moving vehicle, and delicate instrument, equipment, or device; and wherein said sensitive component or element is selected from a group consisting of a jet-intaking vehicle-powering engine, internal or external optically reflective or transmitting surface, mechanically, electrically, or chemically sensitive part, and flying or movement-controlling wing or blade on the vehicle.

10. A cleaning system for preventing undesirable material or object contained in a fluid medium from degrading the performance of a sensitive component or element on a vehicle which is relatively moving in the fluid medium at a given velocity, the density of said undesirable material or object being substantially greater than that of said fluid medium, comprising:

means for forcing said relatively moving fluid stream containing said undesirable material or object to enter and flow, in its entity, in a single spiral path of a simple cross-sectional shape for generating centrifugal forces on both the moving fluid stream and the undesirable material or object; and means for centrifugally separating the undesirable material or object from the fluid stream due to the greater centrifugal force on said undesirable material or object relative to that on said less dense fluid medium, without loss of the fluid stream from said forcing means and said separating means when there is no undesirable material or object in the fluid medium and with only minimal loss of the fluid stream when there is undesirable material or object in the fluid medium.

11. A cleaning system as in claim 10 wherein
said vehicle comprises a vehicle-powering engine which intakes said moving fluid medium and a device for intaking and supplying said fluid medium to the vehicle-powering engine; and wherein said forcing means comprises a spiraling tube; and said separating means comprises:

a centrifuging tube having an outside tube and an inside tube connected and concentric relative thereto thereby providing a donut-shaped centrifugally separating section therein, the outside tube connecting at one end thereof to the spiraling tube and at the other end thereof to said fluid intaking and supplying device of the vehicle-powering engine, thereby changing the cross-sectional shape of the fluid flow duct from that of the spiraling tube near the one end thereof first into that of the donut-shaped centrifugally separating section of the centrifuging tube, and then to that of the other end thereof for connection to the fluid intaking and supplying device of the vehicle-powering engine; and causing the fluid stream to flow between the walls of the two concentric tubes in the donut-shaped separating section of the centrifuging tube; and at least one resilient door provided at the periphery of said outside tube, the resilient force on the door keeping the door normally shut even with the fluid stream flowing between the two concentric tubes; but allowing said undesirable material or object with a sufficient centrifugal force to push open and to escape out of said door for its removal from the intake fluid medium for the vehicle-powering engine.

12. A cleaning system as in claim 10 including means for sensing the amount of said undesirable material or object present in said fluid medium; and computer means for automatically controlling the starting and stopping of said forcing means and said separating means.

13. A cleaning system as in claim 10 wherein said separating means comprises means for providing a separating force which is sufficiently high to keep said moving fluid medium within said spiral path, but insufficiently high to prevent said undesirable material or object from escaping said spiral path.

14. A cleaning system as in claim 10 wherein said undesirable material or object is a solid selected from a group consisting of ice, hail, snow, water, rain, fog, dirt, dust, sand, stone, pebble, leave, twig, bird, and a mixture thereof;
wherein said vehicle is selected from a group consisting of automobile, truck, airplane, hydroplane, submarine, boat, ship, helicopter, train, jet-powered moving vehicle, and delicate instrument, equipment, or device; and
wherein said sensitive component or element is selected from a group consisting of a jet-intaking engine or other vehicle-powering engine, internal or external optically reflective or transmitting surface, mechanically, electrically, or chemically sensitive part, and flying or movement-controlling wing or blade on the vehicle.

15. A cleaning system as in claim 10 wherein said separating means comprises means for utilizing the centrifugal forces to cause the denser undesirable material or object to move predominantly in a first, more peripheral travel path which is different from a second, less peripheral travel path taken by the flowing fluid medium.

16. A cleaning system as in claim 10 wherein said vehicle comprises a vehicle-powering engine which intakes said moving fluid medium and a device for intaking and supplying said fluid medium to the vehicle-powering engine; wherein said forcing means comprises tubular spiraling means; and wherein said separating means comprises:

a centrifuging separating device having an outside tube having an inner cylindrical surface and an inside body having an outer cylindrical surface, said outside tube and said inside body being connected and said two cylindrical surfaces being concentric relative to each other thereby forming a centrifugally separating section therebetween, the outside tube connecting at one end thereof to one end of said tubular spiraling means and at the other end thereof to the fluid intaking and supplying device thereby changing the cross-sectional shape of the fluid flow duct from that of said tubular spiraling means near the one end thereof first into that of the separating section of the centrifuging tube and then to that of said fluid intaking and supplying device; and at least one resilient door provided at the separating section on the periphery of said outside tube, the resilient force on the door being sufficiently high to keep the moving fluid medium inside the fluid flow duct but allowing said undesirable material or object with a sufficient centrifugal force to push open and escape out of said door for its removal from the intake fluid medium for the vehicle-powering engine.

17. A method of preventing undesirable material or object contained in a fluid medium from degrading the performance of a sensitive component or element on a vehicle which is relatively moving in the fluid medium at a given velocity, the density of said undesirable material or object being significantly greater than that of said fluid medium, comprising:

forcing said relatively moving fluid stream containing said undesirable material or object to flow, in its entirety, in a single, spiral path of simple cross-sectional shape for generating centrifugal forces on both the moving fluid stream and the undesirable material or object; and centrifugally separating the undesirable material or object from the fluid stream, without loss of the fluid stream from said forcing step and said separating Step when there is no undesirable material or object in the fluid medium and with only minimal loss of the fluid stream when there is undesirable material or object in the fluid medium.

18. A method as in claim 17 including the additional steps of sensing the amount of said undesirable material or object present in said fluid medium; and automatically controlling the starting and stopping of said forcing and separating steps.

19. A method as in claim 17 wherein said separating step comprises providing a separating force which is sufficiently high to keep said moving fluid medium within said spiral path, but is insufficiently high to prevent said undesirable material or object from escaping said spiral path.

20. A method as in claim 17 including peripherally collecting the thus centrifugally separated undesirable material or object to prevent it from degrading the performance of said sensitive component or element.

21. A method as in claim 17 including providing microprocessor-controlled means responsive to make the system operative or non-operative.

22. A method as in claim 17 wherein said undesirable material or object is a solid selected from a group consisting of ice, snow, hail, dirt, dust, sand, stone, pebble, leave, twig, bird, and a mixture thereof; and said vehicle is selected from a group consisting of automobile, truck, airplane, boat, ship, helicopter, submarine, train, and jet-powered vehicle.

23. A method as in claim 17 including the additional step of peripherally collecting the centrifugally separated, undesirable material or object.

* * * * *